(12) United States Patent
Seo et al.

(10) Patent No.: US 10,133,417 B2
(45) Date of Patent: Nov. 20, 2018

(54) TOUCH INTEGRATED CIRCUIT, AND TOUCH DISPLAY DEVICE AND METHOD OF DRIVING THE SAME

(71) Applicant: LG DISPLAY CO., LTD., Seoul (KR)

(72) Inventors: ByungHyun Seo, Paju-si (KR); HongSung Song, Seoul (KR); Hui Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 104 days.

(21) Appl. No.: 15/223,584

(22) Filed: Jul. 29, 2016

(65) Prior Publication Data

US 2017/0031523 A1    Feb. 2, 2017

(30) Foreign Application Priority Data

Jul. 31, 2015   (KR) .......................... 10-2015-0109180

(51) Int. Cl.
  *G06F 3/041*   (2006.01)
  *G06F 3/044*   (2006.01)

(52) U.S. Cl.
  CPC ............ *G06F 3/0418* (2013.01); *G06F 3/044* (2013.01); *G06F 3/0412* (2013.01)

(58) Field of Classification Search
  CPC ....... G06F 3/0418; G06F 3/044; G06F 3/0412
  See application file for complete search history.

(56) References Cited

U.S. PATENT DOCUMENTS

| | | | | |
|---|---|---|---|---|
| 2012/0229421 | A1* | 9/2012 | Kim | G06F 3/0412 345/174 |
| 2014/0340349 | A1* | 11/2014 | Liu | G06F 3/041 345/174 |
| 2015/0160761 | A1* | 6/2015 | Lee | G06F 3/041 345/174 |
| 2015/0331535 | A1* | 11/2015 | Li | G06F 3/044 348/174 |
| 2016/0259449 | A1* | 9/2016 | Mizuhashi | G06F 3/044 |
| 2016/0328112 | A1* | 11/2016 | Jiang | G06F 3/0416 |

* cited by examiner

*Primary Examiner* — Abbas Abdulselam
(74) *Attorney, Agent, or Firm* — Dentons US LLP

(57) ABSTRACT

Disclosed is an in-cell touch type touch display device and a method of driving the same, which prevent an error of a touch operation from being caused by the delay of a touch report occurring in a large-screen touch display device. The touch display device includes a touch panel, including a plurality of touch sensors, and a driving circuit unit. The driving circuit unit may include a plurality of source/touch driving ICs and a touch IC. The plurality of source/touch driving ICs may supply a touch driving signal to the plurality of touch sensors. The touch IC may perform a touch operation based on touch reports received from the plurality of source/touch driving ICs.

18 Claims, 8 Drawing Sheets

TOUCH INTEGRATED CIRCUIT, AND TOUCH DISPLAY DEVICE AND METHOD OF DRIVING THE SAME

CROSS-REFERENCE TO RELATED APPLICATIONS

This application claims the benefit of Korean Patent Application No. 10-2015-0109180 filed on Jul. 31, 2015, which is hereby incorporated by reference as if fully set forth herein.

BACKGROUND

Field of the Invention

The present invention relates to an in-cell touch type touch display device, and more particularly, to a touch integrated circuit (IC), and a touch display device with improved touch operation and a method of driving the same.

Discussion of the Related Art

Instead of using conventional input devices such as a mouse or a keyboard, a touch panel, which enables a user to directly input information through a screen with a finger or a pen, is being applied to display devices. Since all users can easily manipulate the touch panel, the application of the touch panel is being expanded.

Touch panels are categorized into a resistive type, a capacitance type, an infrared type, etc. depending on a touch sensing method. Recently, since the capacitance type provides convenience in a manufacturing process and is good in touch sensitivity, the capacitance type is attracting much attention. Capacitive touch panels are categorized into a mutual capacitance type and a self-capacitance type.

Recently, liquid crystal display (LCD) devices to which a touch screen is applied have been developed in an in-cell touch type where a capacitive touch sensor is built into a liquid crystal panel, for slimming the LCD devices. In the following description, a touch panel denotes that the touch sensor is built into the liquid crystal panel.

FIG. 1 is a diagram schematically illustrating a related art touch display device. FIG. 2 schematically illustrates the related art touch display device and is a diagram illustrating a rear surface of the touch display device.

Referring to FIGS. 1 and 2, the related art touch display device 1 includes a touch panel 10 and a driving circuit unit. The driving circuit unit includes a source/touch driver 30, a gate driver 40, a touch IC 50, and a timing controller.

The source/touch driver 30 includes a plurality of source/touch driving ICs 35. A half of the plurality of source/touch driving ICs 35 are disposed on an upper end of the touch panel 10, and the other half are disposed on a lower end of the touch panel 10. A plurality of touch sensors 20 are disposed in the touch panel 10, and each of the touch sensors 20 is connected to a corresponding source/touch driving IC 35 through a touch line 22.

The gate driver 40 includes a plurality of gate driving ICs 45, and the plurality of gate driving ICs 45 are disposed on both side surfaces of the touch panel 10.

One touch sensor 20 may be disposed to correspond to a plurality of pixels. For example, each of the touch sensors 20 may be disposed in an area which corresponds to forty pixels in a horizontal direction and twelve pixels in a vertical direction. In this case, each of the touch sensors 20 is configured by a common electrode which is disposed for displaying an image. That is, the plurality of touch sensors 20 are configured by patterning the common electrode.

One frame period is divided into a display period and a touch period, and a display operation and a touch sensing operation are time-divisionally performed. In the display period, a data voltage is supplied to a pixel electrode, and a common voltage (Vcom) is supplied to the plurality of touch sensors 20, thereby displaying an image. In the touch period, the source/touch driver 30 supplies a touch driving signal to each of the touch sensors 20, and the touch IC 50 receives a capacitance charged into each of the touch sensors 20 and senses a variation of the capacitance of each of the touch sensors 20 to determine whether there is a touch and detect a touch position.

In large-screen touch display devices (e.g., 86 inches or more) that display an image at a resolution of 4K ultra high definition (UHD) or more, the number of the touch sensors 20 increases in proportion to a screen size, and for this reason, the number of the touch lines 22 increases. For this reason, the number of the source/touch driving ICs 35 increases.

Lengths of the touch lines 22, which connect the touch sensors 20 to the source/touch driver 30, change depending on positions at which the touch sensors 20 are disposed in the touch panel 10. Therefore, touch sensors (for example, touch sensors disposed over and under the touch panel 10) disposed close to the source/touch driver 30 among the plurality of touch sensors 20 decrease the signal delay of each of the touch lines 22. On the other hand, touch sensors (for example, touch sensors disposed in a center area of the touch panel 10) disposed far apart from the source/touch driver 30 among the plurality of touch sensors 20 increase the signal delay of each of the touch lines 22.

In small-size touch display devices, since a signal delay deviation is small, the touch IC 50 may perform a touch operation as soon as the touch IC 50 receives a touch report of each of the plurality of source/touch driving ICs 35.

On the other hand, in large-size touch display devices, since the number of the source/touch driving ICs 35 increases, a signal delay deviation between the touch IC 50 and the plurality of source/touch driving ICs 35 increases. For this reason, a deviation occurs in delay of a touch report of each of the plurality of source/touch driving ICs 35, and consequently, the touch IC 50 may not normally perform touch operation.

FIG. 3 is a diagram schematically illustrating a video wall device.

Referring to FIG. 3, a video wall device 60 that realizes a large-screen display by using a plurality of touch display devices DP1 to DP4 arranged in a tile form is being developed recently. In FIG. 3, the large-screen video wall device 60 including four touch display devices arranged in a 2*2 form is illustrated.

As described above, if the video wall device 60 is configured by connecting the plurality of touch display devices DP1 to DP4, the error of the touch operation caused by signal delay may occur. Particularly, in the video wall device 60, a signal delay deviation may also occur between touch ICs of individual touch display devices, and for this reason, an error may likely occur when performing touch operation in a whole screen of the video wall device 60.

In the large-screen touch display devices, it is thus beneficial to develop a method that can reduce or prevent an error of touch operation caused by a delay deviation of the touch report of each of the plurality of source/touch driving ICs 35. It is also beneficial to develop a method that can reduce or prevent an error of touch operation caused by a signal delay deviation between a plurality of touch ICs.

SUMMARY

Accordingly, the present invention is directed to provide a touch integrated circuit (IC), and a touch display device and a method of driving the same that substantially obviate one or more problems due to limitations and disadvantages of the related art.

An aspect of the present invention is direct to provide a method that can reduce or prevent an error of a touch operation from being caused by the delay of a touch report occurring in a large-screen touch display device.

Another aspect of the present invention is direct to provide a method that can decrease a signal deviation occurring in a large-screen touch display device.

Another aspect of the present invention is direct to provide a method that can reduce or prevent an error of a touch operation from occurring due to signal delay in a video wall device.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a touch display device including a touch panel, including a plurality of touch sensors, and a driving circuit unit. The driving circuit unit may include a plurality of source/touch driving ICs and a touch IC. The plurality of source/touch driving ICs may supply a touch driving signal to the plurality of touch sensors. The touch IC may perform a touch operation based on touch reports received from the plurality of source/touch driving ICs. Here, the touch display device according to an embodiment of the present invention may include a bridge line connecting each of the plurality of source/touch driving ICs to the touch IC. The plurality of source/touch driving ICs may each include a touch signal synchronizer. The bridge line may be connected to an input terminal of the touch signal synchronizer included in each of the plurality of source/touch driving ICs and may be connected to a first source voltage output terminal of the touch IC. The touch IC according to an embodiment of the present invention may perform the touch operation after reception of the touch reports from the plurality of source/touch driving ICs is completed.

In the touch display device according to an embodiment of the present invention, an output terminal of the touch signal synchronizer may be connected to a second source voltage terminal of the touch IC. The first source voltage may be a high-level voltage, and the second source voltage may be a ground voltage.

In the touch display device according to an embodiment of the present invention, the plurality of source/touch driving ICs and the touch IC may each be configured as an open drain circuit via the bridge line.

In the touch display device according to an embodiment of the present invention, each of the plurality of source/touch driving ICs may turn on the touch signal synchronizer when transmitting the touch reports to the touch IC, thereby discharging the high-level voltage, applied to the bridge line, to the ground.

In the touch display device according to an embodiment of the present invention, if transmission of the touch reports from any one of the plurality of source/touch driving ICs to the touch IC is not completed, the high-level voltage applied to the bridge line may discharged to the ground.

In the touch display device according to an embodiment of the present invention, if transmission of the touch reports to the touch IC is completed, each of the plurality of source/touch driving ICs may turn off the touch signal synchronizer. Therefore, the bridge line may be disconnected from the ground connected to each of the plurality of source/touch driving ICs.

In another aspect of the present invention, there is provided a method of driving a touch display device. In the method, a plurality of source/touch driving ICs may transmit touch reports of a plurality of touch sensors to a touch IC, the plurality of touch sensors being disposed in a touch panel, and the touch IC may perform a touch operation based on the touch reports transmitted from the plurality of source/touch driving ICs. Here, the touch IC may perform the touch operation after reception of the touch reports from the plurality of source/touch driving ICs is completed.

The method of driving the touch display device according to an embodiment of the present invention may latch the transmitted touch reports until reception of the touch reports from the plurality of source/touch driving ICs is completed.

The method of driving the touch display device according to an embodiment of the present invention may postpone performing of the touch operation if transmission of the touch reports from any one of the plurality of source/touch driving ICs to the touch IC is not completed.

The method of driving the touch display device according to an embodiment of the present invention may delete the latched touch reports if reception of the touch reports from the plurality of source/touch driving ICs is not completed for a certain time. Subsequently, the method may start to transmit and receive touch reports of a next frame.

In another aspect of the present invention, there is provided a touch IC including a touch driver and a touch sensing unit. The touch driver may supply a touch driving signal to a plurality of touch sensors disposed in a touch panel. The touch sensing unit may perform a touch operation based on touch reports received from the plurality of touch sensors. Here, the touch sensing unit may perform the touch operation after reception of the touch reports from the plurality of touch drivers is completed.

If transmission of the touch reports from any one of the plurality of touch drivers to the touch sensing unit is not completed, the touch IC may postpone performing of the touch operation.

The touch IC may latch the received touch reports until reception of the touch reports from the plurality of touch drivers is completed.

If reception of the touch reports from the plurality of touch drivers is not completed for a certain time, the touch IC may delete the latched touch reports and start to transmit and receive touch reports of a next frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Figure 1:
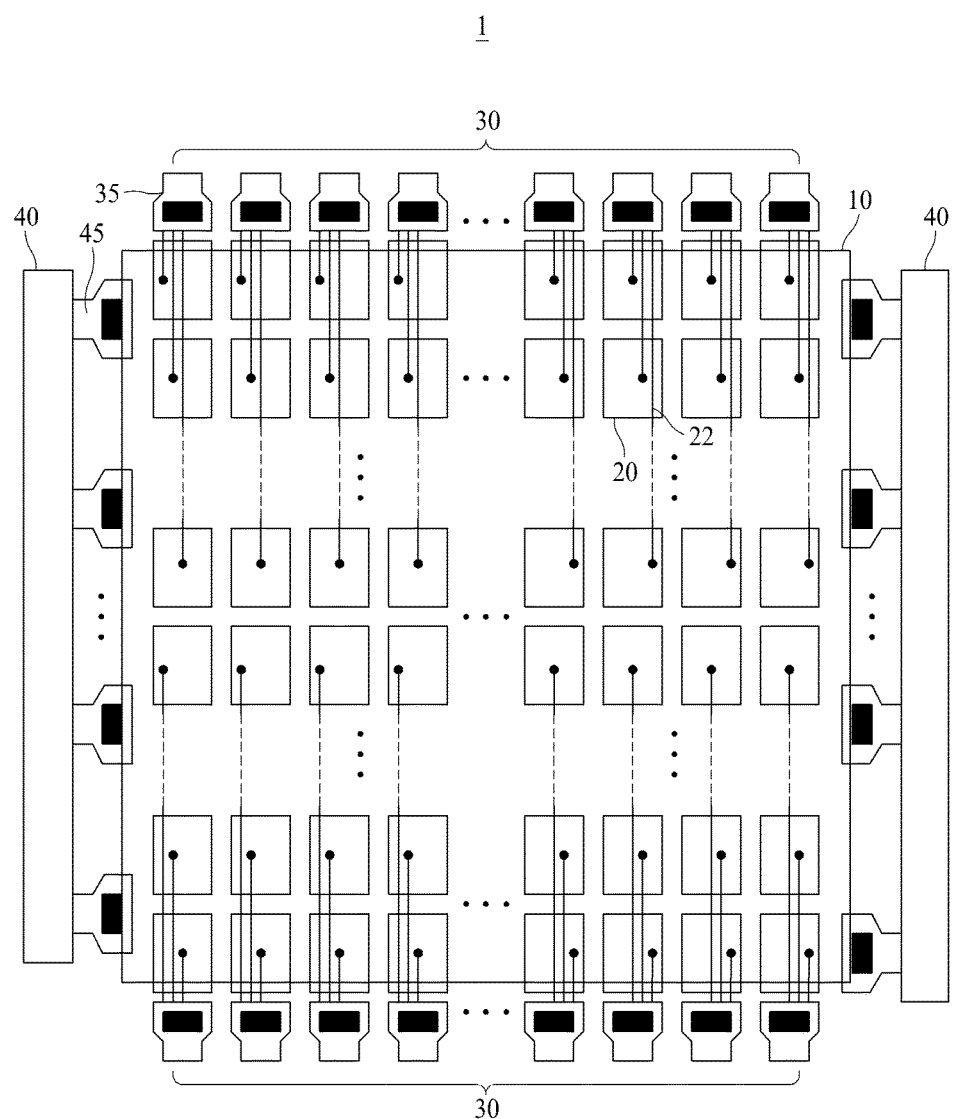
FIG. 1 schematically illustrates a related art touch display device and is a diagram illustrating a front surface of the touch display device.
Figure 2:
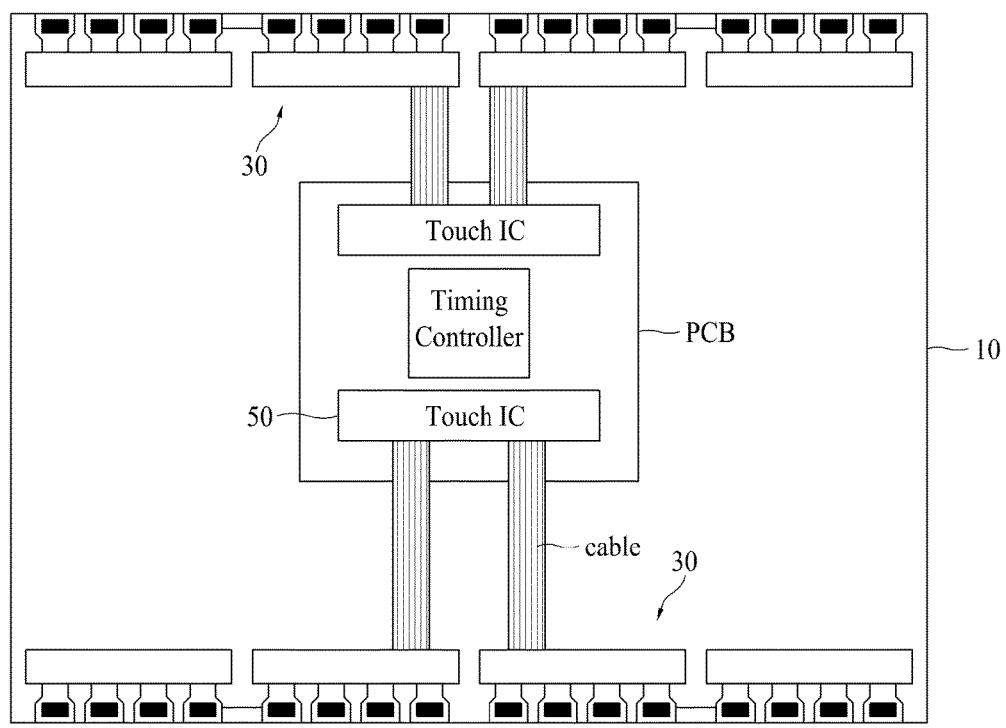
FIG. 2 schematically illustrates the related art touch display device and is a diagram illustrating a rear surface of the touch display device.

Reference will now be made in detail to the exemplary embodiments of the present invention, examples of which are illustrated in the accompanying drawings. Wherever possible, the same reference numbers will be used throughout the drawings to refer to the same or like parts.

In the specification, it should be noted that like reference numerals already used to denote like elements in other drawings are used for elements wherever possible. In the following description, when a function and a configuration known to those skilled in the art are irrelevant to the essential configuration of the present invention, their detailed descriptions will be omitted. The terms described in the specification should be understood as follows.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Furthermore, the present invention is only defined by scopes of claims.

In the specification, in adding reference numerals for elements in each drawing, it should be noted that like reference numerals already used to denote like elements in other drawings are used for elements wherever possible.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

LCD devices have been variously developed in a twisted nematic (TN) mode, a vertical alignment (VA) mode, an in-plane switching (IPS) mode, and a fringe field switching (FFS) mode depending on to a method of adjusting the alignment of liquid crystal.

The TN mode and the VA mode among the modes are modes in which a pixel electrode is disposed on a lower substrate, and a common electrode is disposed on an upper substrate (a color filter array substrate), thereby adjusting the alignment of liquid crystal with a vertical electric field.

The IPS mode and the FFS mode are modes in which a pixel electrode and a common electrode are disposed on a lower substrate, and the alignment of liquid crystal is adjusted with an electric field between the pixel electrode and the common electrode.

The IPS mode is a mode in which a plurality of pixel electrodes and a plurality of common electrodes are alternately arranged in parallel, and thus, a lateral electric field is generated between a pixel electrode and a common electrode adjacent to each other, thereby adjusting the alignment of liquid crystal. The FFS mode is a mode in which a pixel electrode and a common electrode are provided in plurality to be spaced apart from each other with an insulating layer therebetween. In this case, one electrodes of the pixel electrodes and common electrodes are formed in a plate shape or a pattern, and the other electrodes are formed in a finger shape. The FFS mode is a mode that adjusts the alignment of liquid crystal with fringe fields generated between the pixel electrodes and common electrodes.

A mode of a touch panel according to an embodiment of the present invention is not limited, and a vertical alignment mode (the TN mode and the VA mode) and an in-plane switching mode (the IPS mode and the FFS mode) may be applied to the touch panel according to an embodiment of the present invention. In this disclosure below, an example where the IPS mode or the FFS mode is applied to the touch panel will be described.

Hereinafter, a touch display device and a method of driving the same according to embodiments of the present invention will be described based on an example where a plurality of touch sensors are arranged in a touch panel, and touch sensing is performed in a self-capacitance type.

However, the present invention is not limited thereto, and the touch display device and the method of driving the same according to embodiments of the present invention may also be based on another example where a plurality of touch driving electrodes and a plurality of touch sensing electrodes are arranged in a touch panel, and touch sensing is performed in a mutual capacitance type.

Hereinafter, a touch display device and a method of driving the same according to embodiments of the present invention will be described in detail with reference to the accompanying drawings.

Figure 4:
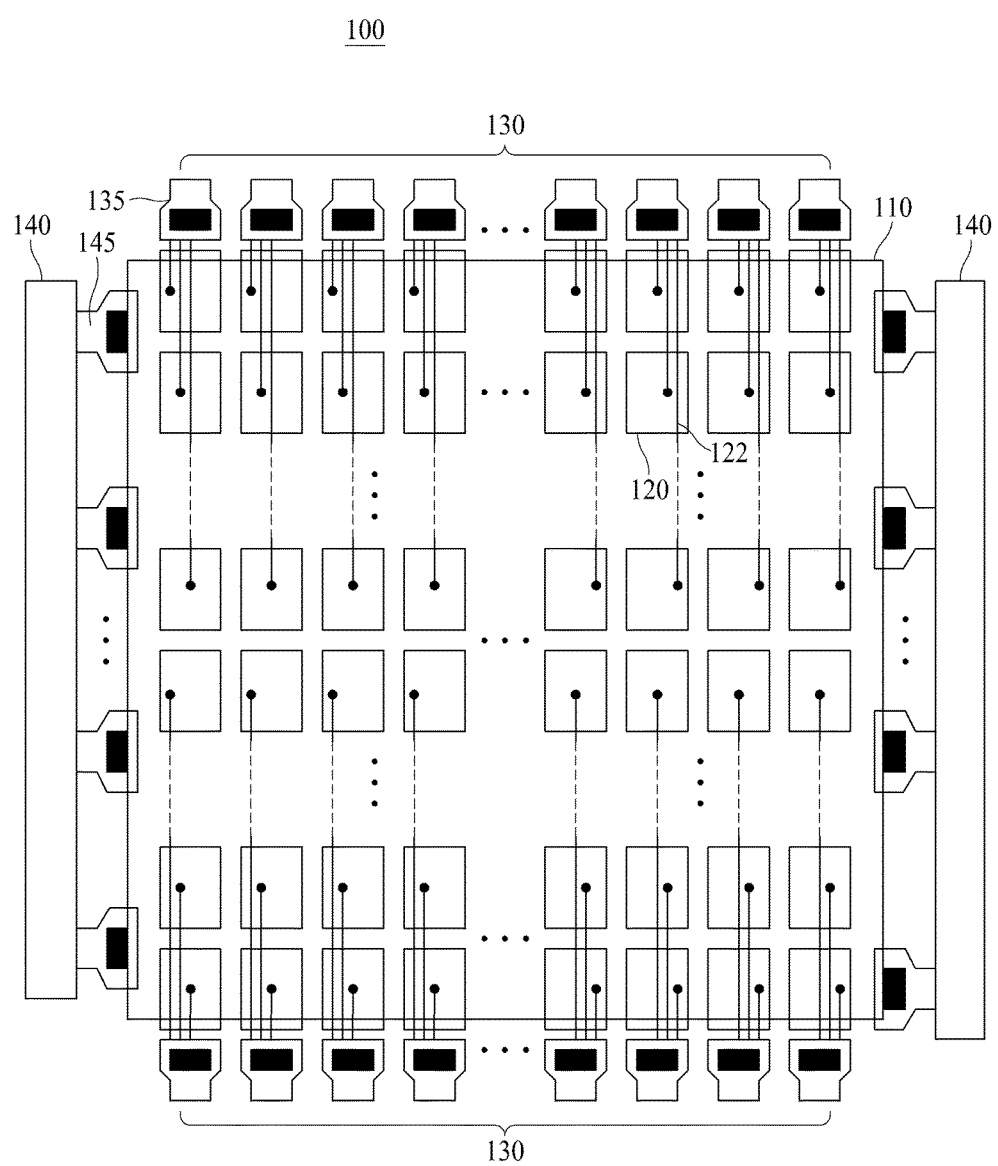
FIG. 4 schematically illustrates a touch display device according to an embodiment of the present invention and is a diagram illustrating a front surface of the touch display device.
Figure 5:
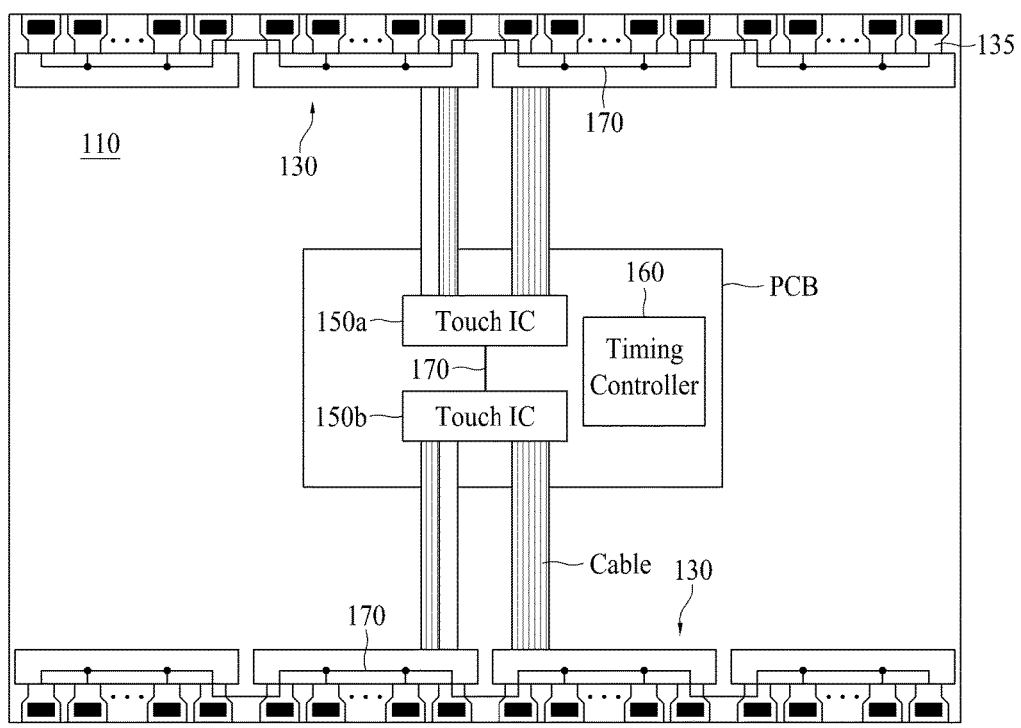
FIG. 5 schematically illustrates a touch display device according to an embodiment of the present invention and is a diagram illustrating a rear surface of the touch display device.

FIG. 4 schematically illustrates a touch display device according to an embodiment of the present invention and is a diagram illustrating a front surface of the touch display device. FIG. 5 schematically illustrates the touch display device according to an embodiment of the present invention and is a diagram illustrating a rear surface of the touch display device.

Referring to FIGS. 4 and 5, the touch display device 100 according to an embodiment of the present invention may include a touch panel 110 and a driving circuit unit. A plurality of touch sensors 120 may be disposed in the touch panel 110.

The driving circuit unit may include a source/touch driver 130 including a plurality of source/touch driving ICs 135, a gate driver 140 including a plurality of gate driving ICs 145, a plurality of touch ICs 150a and 150b, a timing controller 160, and a power supply (not shown).

Figure 3:
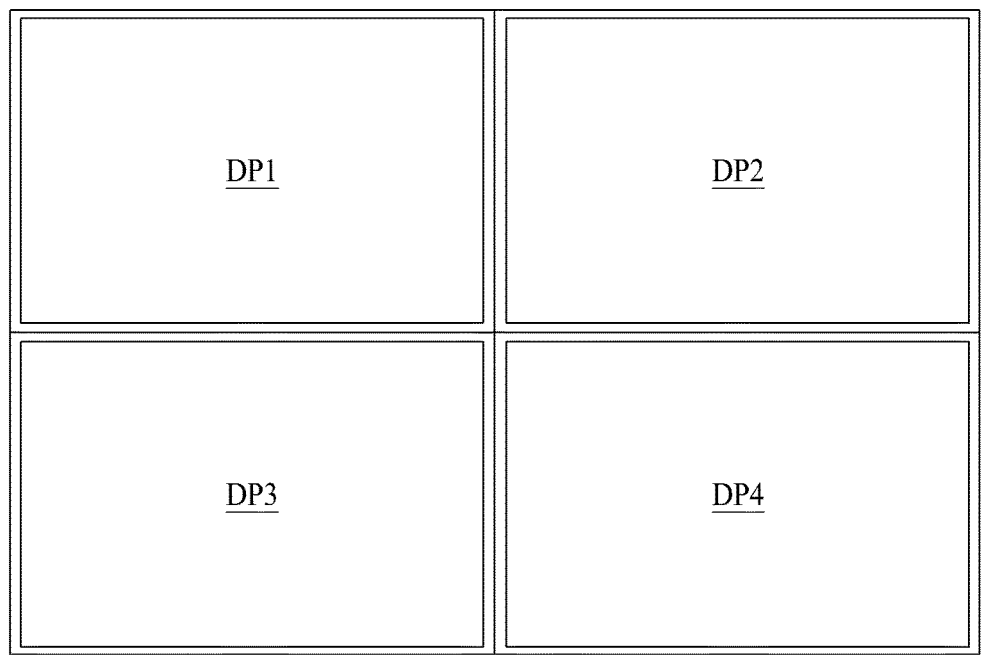
FIG. 3 is a diagram schematically illustrating a video wall device.

The touch panel 110 may include a liquid crystal panel and the plurality of touch sensors 120 coupled to the liquid crystal panel, and light should be supplied to the touch panel 110 so as to display an image. To this end, the touch display device 100 according to an embodiment of the present invention may include a backlight unit. The backlight unit is not illustrated in FIG. 3.

The touch panel 110 may include a thin film transistor (TFT) array substrate (a first substrate), a color filter array substrate (a second substrate), and a liquid crystal layer disposed therebetween.

A plurality of RGB color filters may be disposed on the color filter array substrate to respectively correspond to a plurality of subpixels. Also, a black matrix that defines an opening area of each of the subpixels and prevents colors from being mixed with each other may be disposed on the color filter array substrate.

The plurality of subpixels may be arranged in a matrix type on the TFT array substrate 110 and may be defined by a plurality of data lines and a plurality of gate lines which intersect each other. A red (R) subpixel, a green (G) subpixel, and a blue (B) subpixel may configure one pixel. Each of the subpixels may include a TFT which is a switching element, a pixel electrode, a common electrode, and a storage capacitor (Cst). Here, the pixel electrode may be provided in each of the subpixels, and the common electrode may be provided in units of a plurality of subpixels.

In the present embodiment, the common electrode may be used as each of the touch sensors 120, in addition to an electrode for displaying an image. To this end, the plurality of touch sensors 120 may be provided by patterning the common electrode in units of a plurality of subpixels. The pixel electrode and the touch sensors 120 may each be formed of a transparent conductive material such as indium tin oxide (ITO) and/or the like.

Here, the plurality of touch sensors 120 may each be provided in an area corresponding to a plurality of pixels. Each of the plurality of touch sensors 120 may be disposed in an area which corresponds to forty pixels in a horizontal direction and twelve pixels in a vertical direction. That is, one touch sensor 120 may be disposed in an area corresponding to 480 pixels. However, the present embodiment is not limited thereto, and a size of each of the touch sensors 120 may be modified based on a size of the touch panel 110 and desired touch performance. The plurality of touch sensors 120 may not be disposed in the same size, and for example, second touch sensors disposed an outer portion (edges of four surfaces) of the touch panel 110 may be smaller in size than first touch sensors disposed in a middle portion of the touch panel 110.

The source/touch driving ICs 135 may each include a data driver and a touch driver. The source/touch driving ICs may include one data driver and one touch driver, or may include the one data driver and a plurality of touch drivers.

A plurality of data lines DL respectively disposed in a plurality of subpixels may be connected to the data driver, and an image signal (a pixel electrode voltage) may be supplied to each of the subpixels through a corresponding data line DL. Also, the plurality of touch sensors 120 disposed in the touch panel 110 may be connected to the source/touch driver 130 through a plurality of touch lines 140, respectively.

The data driver of the source/touch driver 130 may convert digital RGB image data, supplied from the timing controller 170, into analog image signals, namely, RGB data voltages. Also, the source/touch driver 130 may respectively supply the data voltages to the plurality of data lines DL at a time when the TFT of each subpixel is turned on based on the data control signal DCS supplied from the timing controller 170. The data voltages may be respectively supplied to the plurality of subpixels, and a common voltage Vcom may be supplied to the plurality of touch sensors 120, thereby displaying an image. In this case, the power supply may generate the common voltage Vcom and may supply the common voltage Vcom to the plurality of touch sensors 120. In another embodiment, the touch ICs 150a and 150b may generate the common voltage Vcom and may supply the common voltage Vcom to the plurality of touch sensors 120.

The touch driver may generate a touch driving signal and may supply the touch driving signal to the plurality of touch sensors 120 through the plurality of touch lines 120 respectively connected to the plurality of touch sensors 120.

Here, the touch lines 122 may be arranged in the same direction as the data lines DL. The touch lines 122 may be disposed on the same layer as the data lines DL. However, the present embodiment is not limited thereto, and the touch lines 122 may be disposed on a layer different from a layer on which the data lines DL are disposed.

The touch display device 100 according to an embodiment of the present invention may distinguish a display period and a touch period to display an image and sense a touch. For example, the touch display device 100 may divide one frame period into the display period and the touch period to time-divisionally perform a display operation and a touch sensing operation.

In the display period, a data voltage may be supplied to a pixel electrode, and a common voltage (Vcom) is supplied to the plurality of touch sensors 120, thereby displaying an image. In the touch period, the driving circuit unit may supply the touch driving signal to each of the touch sensors 120 and may sense a variation of a capacitance charged into each of the touch sensors 120 to determine whether there is a touch and detect a touch position.

Referring again to FIG. 3, the timing controller 160 may convert input RGB image signals into frame-unit digital RGB image data by using a timing signal TS input from the outside and may supply the RGB image data to the source/touch driver 130. In this case, the timing signal TS may include a vertical sync signal V-sync, a horizontal sync signal H-sync, a clock signal CLK, etc.

The timing controller 160 may generate a gate control signal GCS for controlling the gate driver 140 by using the timing signal TS to supply the gate control signal GCS to the gate driver 140. The gate control signal GCS may include a gate start pulse GSP, a gate shift clock GSC, a gate output enable signal GOE, etc.

The timing controller 160 may further generate a data control signal DCS for controlling the source/touch driver 130 by using the timing signal TS and may supply the data control signal DCS to the source/touch driver 130. The data control signal DCS may include a source start pulse SSP, a source sampling clock SSC, a source output enable signal SOE, a polarity control signal POL, etc.

Moreover, the timing controller 160 may supply a synchronization signal for distinguishing the display period and the touch period to the plurality of touch ICs 150a and 150b, in order for the plurality of touch ICs 150a and 150b to be driven in the touch period. That is, the plurality of touch ICs 150a and 150b may distinguish the display period and the touch period, based on the synchronization signal supplied from the timing controller 160 and may perform the touch sensing operation in the touch period.

In the display period of one frame period, the gate driver 140 may sequentially supply a gate driving signal to a plurality of gate lines GL disposed in the touch panel 110. The TFT included in each subpixel may be turned on by the gate driving signal.

The data driver of the source/touch driver 130 may respectively supply data voltages to the plurality of data lines DL at a time when the TFT of each subpixel is turned on. The data voltages may be respectively supplied to the plurality of subpixels, and the common voltage Vcom may be supplied to the plurality of touch sensors 120, thereby displaying an image.

A first touch IC 150a of the plurality of touch ICs 150a and 150b may be connected to a plurality of first source/touch driving ICs 135 disposed on an upper side of the touch panel 110. The first touch IC 150a may perform a touch operation of determining whether there is a touch and detecting a touch position, based on a touch report received from each of the plurality of first source/touch driving ICs 135.

A second touch IC 150b of the plurality of touch ICs 150a and 150b may be connected to a plurality of second source/touch driving ICs 135 disposed on a lower side of the touch panel 110. The second touch IC 150b may perform the touch operation of determining whether there is a touch and detecting a touch position, based on a touch report received from each of the plurality of second source/touch driving ICs 135.

Figure 6:
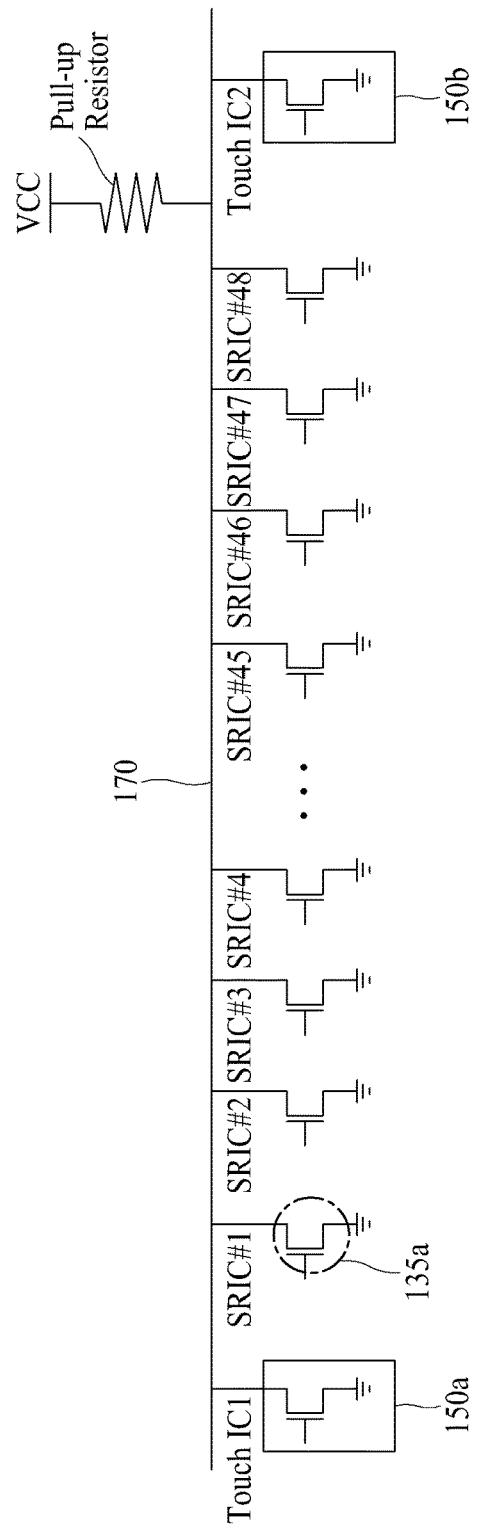
FIG. 6 is a diagram illustrating an operation where because each of a plurality of source/touch driving ICs is connected to a bridge line, touch report data is latched until touch reports of the plurality of source/touch driving ICs are all completed.
Figure 7:
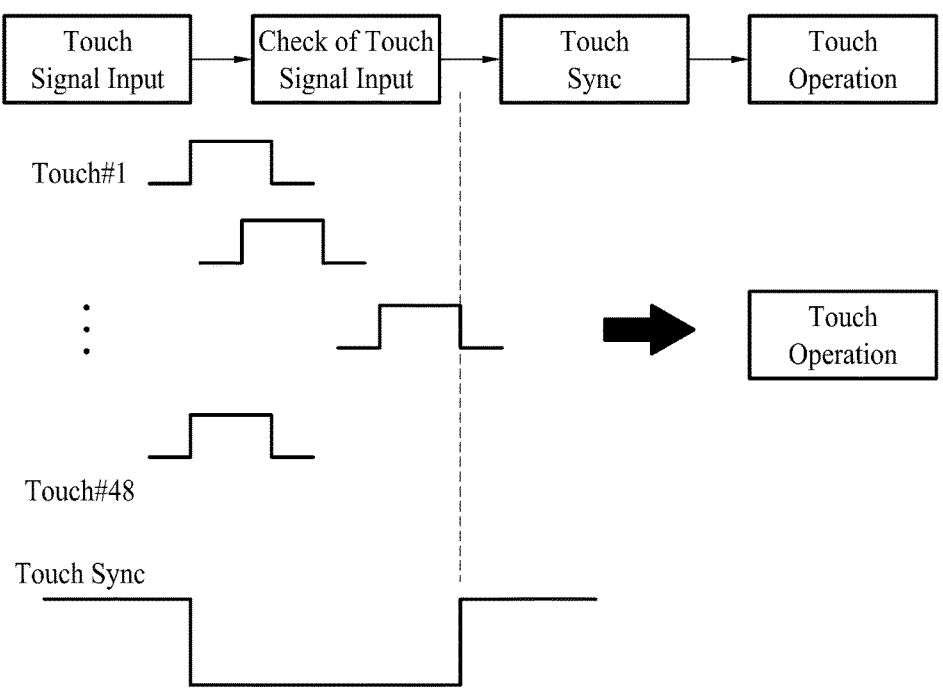
FIG. 7 is a diagram illustrating a method of performing a touch operation based on touch report data about a plurality of source/touch driving ICs.
Figure 8:
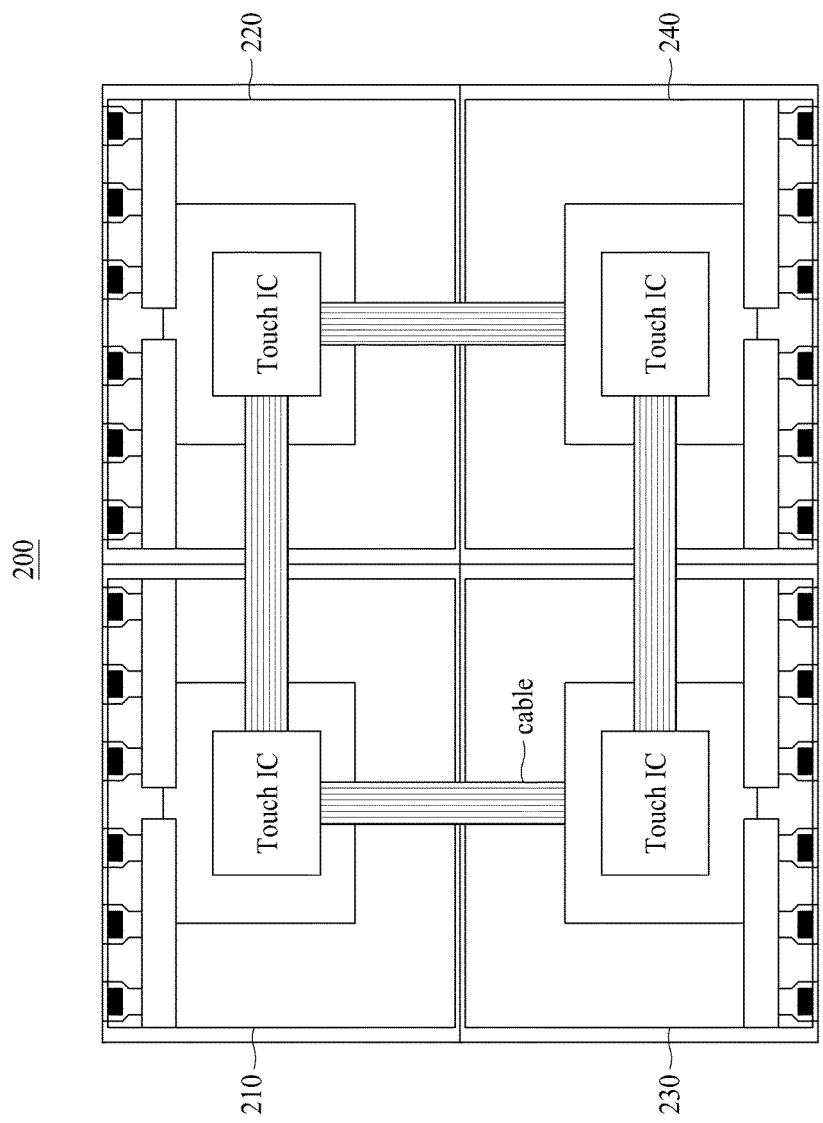
FIG. 8 is a diagram illustrating a video wall device configured with a touch display device according to an embodiment of the present invention.

FIG. 6 is a diagram illustrating an operation where because each of a plurality of source/touch driving ICs is connected to a bridge line, touch report data is latched until touch reports of the plurality of source/touch driving ICs are all completed. FIG. 7 is a diagram illustrating a method of performing a touch operation based on touch report data about a plurality of source/touch driving ICs.

Referring to FIGS. 5 to 7, the touch display device 100 according to an embodiment of the present invention may include a bridge line 170 that connects each of the plurality of source/touch driving ICs 135 to the touch ICs 150a and 150b. The bridge line 170 may be connected to an input terminal of a touch signal synchronizer 135a included in each of the plurality of source/touch driving ICs 135. Also, the bridge line 170 may be connected to a first source voltage output terminal of each of the touch ICs 150a and 150b. Also, an output terminal of the touch signal synchronizer 135a may be connected to a second source voltage terminal of each of the touch ICs 150a and 150b. Here, the first source voltage may be a high-level voltage Vcc, and the second source voltage may be a ground GND voltage.

A pull-up resistor may be provided in the first source voltage output terminal of each of the touch ICs 150a and 150b, and the high-level voltage Vcc may be applied to the bridge line 170 by the pull-up resistor.

A signal delay deviation of the plurality of source/touch driving ICs 135 is reduced in consideration of the following signal delay. In this case, even when signal output delays of the plurality of source/touch driving ICs 135 differ, the signal delay deviation is removed by synchronizing times when signals are finally received.

First, the touch ICs 150a and 150b according to an embodiment of the present invention have removed or reduced a signal delay deviation, based on a case where signal delay between adjacent printed circuit boards (PCBs) is small, and signal delay between the plurality of source/touch driving ICs 135 is large.

Second, the touch ICs 150a and 150b according to an embodiment of the present invention have removed or reduced the signal delay deviation, based on a case where there is no signal delay between adjacent PCBs, and there is no signal delay between the plurality of source/touch driving ICs 135.

Third, the touch ICs 150a and 150b according to an embodiment of the present invention have removed or reduced the signal delay deviation, based on a case where signal delay between adjacent PCBs is large, and signal delay between the plurality of source/touch driving ICs 135 is large.

Fourth, by using the touch ICs 150a and 150b, the signal delay deviation has been removed or reduced, based on a case where there is a signal delay deviation between the plurality of touch ICs 150a and 150b, signal delay between adjacent PCBs is large, and signal delay between the plurality of source/touch driving ICs 135 is large.

In small-size touch display devices, the signal delay deviation is removed or reduced by reflecting a first item and a second item of the four items. However, as in the present embodiment, in large-size touch display devices, the signal delay deviation is removed or reduced by reflecting all of the four items.

The touch ICs 150a and 150b of the touch display device 100 according to an embodiment of the present invention may perform the touch operation after a touch report is completely received from each of the plurality of source/touch driving ICs 135. Here, the plurality of source/touch driving ICs 135 and the touch ICs 150a and 150b may each be configured as an open drain circuit via the bridge line 170.

Each of the plurality of source/touch driving ICs 135 may generate a touch IC synchronization enable signal when transmitting a touch report to the touch IC 150a or 150b. Also, the generated synchronization enable signal may be input to a gate terminal of the touch signal synchronizer 135a to turn on the touch signal synchronizer 135a. Therefore, the high-level voltage Vcc applied to the bridge line 170 may be discharged to the ground GND.

Here, if transmission of a touch report from any one of the plurality of source/touch driving ICs 135 to the touch ICs 150a and 150b is not completed, the high-level voltage Vcc applied to the bridge line 170 may be discharged to the ground GND. Also, the touch ICs 150a and 150b may latch received touch reports until reception of all touch reports from the plurality of source/touch driving ICs 135 is completed. In this case, the received touch reports may be latched in memories of the touch ICs 150a and 150b. Also, if transmission of the touch report from any one of the plurality of source/touch driving ICs 135 to the touch ICs 150a and 150b is not completed, the touch ICs 150a and 150b may postpone performing of the touch operation.

However, a latch operation and a standby state may not infinitely be maintained until reception of all touch reports from the plurality of source/touch driving ICs 135 is completed. If reception of the touch reports from the plurality of source/touch driving ICs 135 to the touch ICs 150a and 150b is not completed for a certain time (for example, one frame), touch reports latched in the memories of the touch ICs 150a and 150b may be discarded. Subsequently, touch reports of a next frame may start to be transmitted and received.

Moreover, if transmission of touch reports from the plurality of source/touch driving ICs 135 to the touch ICs 150a and 150b is completed, the touch ICs 150a and 150b may turn off the touch signal synchronizer 135a. Therefore, a ground terminal connected to each of the plurality of source/touch driving ICs 135 may be disconnected from the bridge line 170.

If all ground terminals are disconnected from the bridge line 170, a high voltage may be applied to the bridge line 170 by the pull-up resistor. The touch ICs 150a and 150b may recognize that a voltage flowing in the bridge line 170 is shifted from a ground level to a high-voltage level, and transmission of touch reports of all the source/touch driving ICs 135 to the touch ICs 150a and 150b is completed. Subsequently, the touch ICs 150a and 150b may each perform the touch operation based on the touch reports input from the plurality of source/touch driving ICs 135.

As a detailed example, each of the touch ICs according to an embodiment of the present invention may include a plurality of touch drivers and a touch sensing unit. In an embodiment, the touch drivers may be disposed in the source/touch driver and may be spaced apart from the touch sensing unit, but is not limited thereto. In other embodiments, the touch drivers and the touch sensing unit may be mounted on one PCB or may be integrated into one IC. The touch driver may supply the touch driving signal to the plurality of touch sensors disposed in the touch panel. Also, the touch sensing unit may perform the touch operation based on touch reports received from the plurality of touch sensors. Here, the touch sensing unit may perform the touch operation after reception of the touch reports from the plurality of touch drivers is completed.

If transmission of touch report from any one of the plurality of touch drivers is not completed, the touch IC according to an embodiment of the present invention may postpone performing of the touch operation.

The touch sensing unit of the touch IC according to an embodiment of the present invention may latch received touch reports until reception of touch reports from the plurality of touch drivers is completed.

If reception of the touch reports from the plurality of touch drivers is not completed for a certain time, the touch sensing unit of the touch IC according to an embodiment of the present invention may discard the latched touch reports and may start to transmit and receive touch reports of a next frame.

The above-described essential elements and functions of the touch display device 100 according to an embodiment of the present invention will be summarized and described below.

The touch display device 100 according to an embodiment of the present invention may include the touch panel 110, where the plurality of touch sensors 120 are disposed, and the driving circuit unit. The driving circuit unit may include the plurality of source/touch driving ICs 135 and the plurality of touch ICs 150a and 150b. The plurality of source/touch driving ICs 135 may supply the touch driving signal to the plurality of touch sensors 120. The touch ICs 150a and 150b may each perform the touch operation based on touch reports received from the plurality of source/touch driving ICs 135. Here, the touch display device 100 according to an embodiment of the present invention may include the bridge line 170 that connects each of the plurality of source/touch driving ICs 135 to the touch ICs 150a and 150b. The bridge line 170 may be connected to the input terminal of the touch signal synchronizer 135a included in each of the plurality of source/touch driving ICs 135. Also, the bridge line 170 may be connected to the first source voltage input terminal of each of the touch ICs 150a and 150b. The touch ICs 150a and 150b according to an embodiment of the present invention may each perform the touch operation after reception of the touch reports from the plurality of source/touch driving ICs 135 is completed.

In the touch display device 100 according to an embodiment of the present invention, the output terminal of the touch signal synchronizer 135a may be connected to the second source voltage terminal of each of the touch ICs 150a and 150b. Here, the first source voltage may be a high-level voltage, and the second source voltage may be the ground GND voltage.

In the touch display device 100 according to an embodiment of the present invention, the plurality of source/touch driving ICs 135 and the touch ICs 150*a* and 150*b* may each be configured as the open drain circuit via the bridge line 170.

In the touch display device 100 according to an embodiment of the present invention, each of the plurality of source/touch driving ICs 135 may turn on the touch signal synchronizer 135*a* when transmitting a touch report to the touch IC 150*a* or 150*b*. Therefore, the high-level voltage Vcc applied to the bridge line 170 may be discharged to the ground GND.

In the touch display device 100 according to an embodiment of the present invention, if transmission of a touch report from any one of the plurality of source/touch driving ICs 135 to the touch ICs 150*a* and 150*b* is not completed, the high-level voltage Vcc applied to the bridge line 170 may be discharged to the ground GND.

In the touch display device 100 according to an embodiment of the present invention, if transmission of touch reports to the touch ICs 150*a* and 150*b* is completed, each of the plurality of source/touch driving ICs 135 may turn off the touch signal synchronizer 135*a*. Therefore, the ground GND terminal may be disconnected from the bridge line 170.

As described above, the touch display device and the method of driving the same according to the embodiments of the present invention prevent the error of the touch operation from being caused by the delay of the touch report occurring in the large-screen touch display device.

Moreover, the touch display device and the method of driving the same according to the embodiments of the present invention decreases the signal deviation occurring in the large-screen touch display device.

Moreover, if the touch display device and the method of driving the same according to the embodiments of the present invention are applied to the video wall device, the error of the touch operation is prevented from occurring due to the signal delay.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch display device comprising:
   a touch panel including a plurality of touch sensors;
   a plurality of source/touch driving integrated circuits (ICs) supplying a touch driving signal to the plurality of touch sensors;
   a touch IC performing a touch operation based on touch reports received from the plurality of source/touch driving ICs; and
   a bridge line connecting each of the plurality of source/touch driving ICs to the touch IC,
   wherein the plurality of source/touch driving ICs each comprise a touch signal synchronizer,
   the bridge line is connected to an input terminal of the touch signal synchronizer and is connected to a first source voltage output terminal of the touch IC, and
   the touch IC latches the received touch reports when a voltage over the bridge line is a first voltage level and performs the touch operation based on the latched touch reports when the voltage over the bridge line is shifted from the first voltage level to a second voltage level upon completion of receiving the touch reports from the plurality of source/touch driving ICs.

2. The touch display device of claim 1, wherein
   an output terminal of the touch signal synchronizer is connected to a second source voltage terminal of the touch IC, and
   the first source voltage is the second level voltage, and the second source voltage is the first level voltage.

3. The touch display device of claim 2, wherein a pull-up resistor is disposed in the first source voltage output terminal of the touch IC and the second voltage level is applied to the bridge line by the pull-up resistor.

4. The touch display device of claim 2, wherein the plurality of source/touch driving ICs and the touch IC are each configured as an open drain circuit via the bridge line.

5. The touch display device of claim 4, wherein each of the plurality of source/touch driving ICs turns on the touch signal synchronizer when transmitting the touch reports to the touch IC, thereby discharging the second voltage level, applied to the bridge line, to the ground.

6. The touch display device of claim 5, wherein each of the plurality of source/touch driving ICs generates a touch IC synchronization enable signal and applies the generated touch IC synchronization enable signal to a gate terminal of the touch signal synchronizer to turn on the touch signal synchronizer.

7. The touch display device of claim 5, wherein if transmission of the touch reports from any one of the plurality of source/touch driving ICs to the touch IC is not completed, the second level voltage applied to the bridge line is discharged to the ground.

8. The touch display device of claim 7, wherein if transmission of the touch reports to the touch IC is completed, each of the plurality of source/touch driving ICs turns off the touch signal synchronizer to disconnect the bridge line from the ground.

9. The touch display device of claim 1, wherein if transmission of the touch reports from any one of source/touch driving ICs to the touch IC is not completed, the touch IC postpones performing of the touch operation.

10. The touch display device of claim 1, wherein if reception of the touch reports from the plurality of source/touch driving ICs is not completed for a certain time, the touch IC discards the latched touch reports.

11. The touch display device of claim 10, wherein if the latched touch reports are discarded, the touch IC starts to transmit and receive touch reports of a next frame.

12. The touch display device of claim 1, wherein the touch signal synchronizer is configured to synchronize times when the touch reports are finally received by the touch IC.

13. A method of driving a touch display device, the method comprising:
    transmitting, by a plurality of source/touch driving integrated circuits (ICs), touch reports of a plurality of touch sensors to a touch IC, the plurality of touch sensors being disposed in a touch panel;
    latching, by the touch IC, the touch reports received from the plurality of source/touch driving ICs when a voltage over a bridge line connecting the plurality of source/touch driving ICs and the touch IC is a first voltage level, and
    performing, by the touch IC, a touch operation based on the latched touch reports when the voltage over the bridge line is shifted from the first voltage level to a second voltage level upon completion of transmitting the touch reports from the plurality of source/touch driving ICs.

14. The method of claim 13, further comprising: if transmission of the touch reports from any one of the plurality of source/touch driving ICs to the touch IC is not completed, postponing performing of the touch operation.

15. The method of claim 14, further comprising:
if reception of the touch reports from the plurality of source/touch driving ICs is not completed for a certain time, discarding the latched touch reports; and
starting to transmit and receive touch reports of a next frame.

16. A touch integrated circuit (IC) comprising:
a plurality of touch drivers supplying a touch driving signal to a plurality of touch sensors disposed in a touch panel; and
a touch sensing unit performing a touch operation based on touch reports received from the plurality of touch sensors,
wherein the touch sensing unit latches the received touch reports when a voltage over a bridge line connecting the plurality of touch drivers and the touch sensing unit is a first voltage level and performs the touch operation based on the latched touch reports when the voltage over the bridge line is shifted from the first voltage level to a second voltage level upon completion of receiving the touch reports from the plurality of touch sensors.

17. The touch IC of claim 16, wherein if transmission of the touch reports from any one of the plurality of touch drivers to the touch sensing unit is not completed, the touch IC postpones performing of the touch operation.

18. The touch IC of claim 16, wherein if reception of the touch reports from the plurality of touch drivers is not completed for a certain time, the touch IC discards the latched touch reports and starts to transmit and receive touch reports of a next frame.

* * * * *